Jan. 15, 1946. F. C. RUSHING ET AL 2,393,069
VIBROGRAPH
Filed Dec. 9, 1941 3 Sheets-Sheet 1

WITNESSES:
E. A. McCloskey
W. B. Young

INVENTORS
Frank C. Rushing, Harry C. Werner
and Benjamin Cometti.
BY
Paul E. Friedemann
ATTORNEY Jan. 15, 1946.  F. C. RUSHING ET AL  2,393,069
VIBROGRAPH
Filed Dec. 9, 1941  3 Sheets-Sheet 2
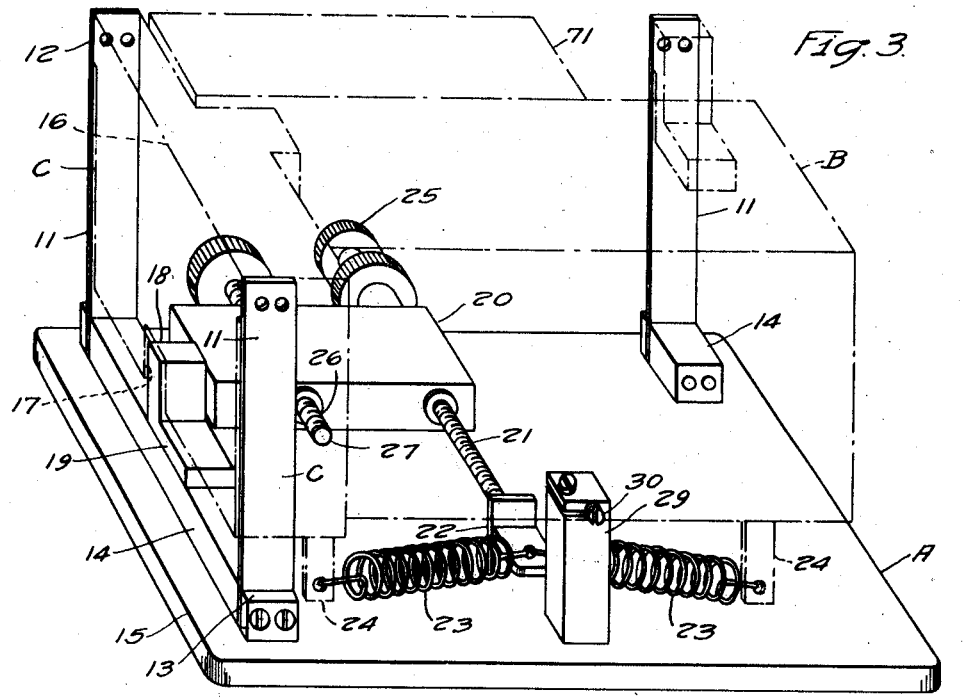
Fig. 3.
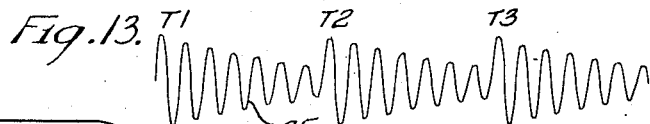
Fig. 13.
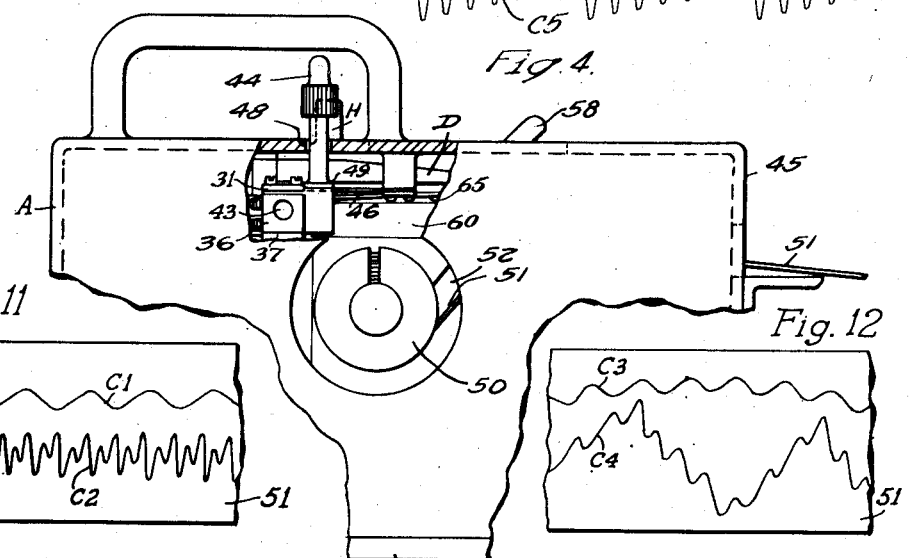
Fig. 4.
Fig. 11
Fig. 12
WITNESSES:
E. A. M'Closkey.
J. W. Young
INVENTORS
Frank C. Rushing, Harry C. Werner
and Benjamin Cametti.
BY
Paul E. Friedemann
ATTORNEY Jan. 15, 1946.　　　F. C. RUSHING ET AL　　　2,393,069
VIBROGRAPH
Filed Dec. 9, 1941　　　3 Sheets-Sheet 3
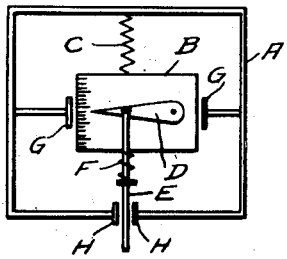
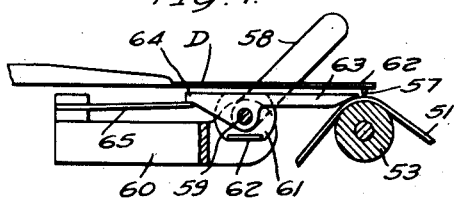
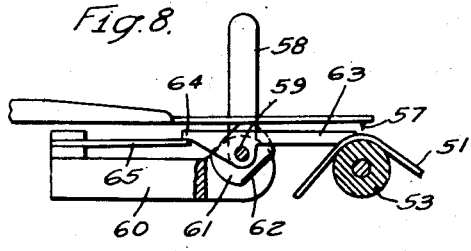
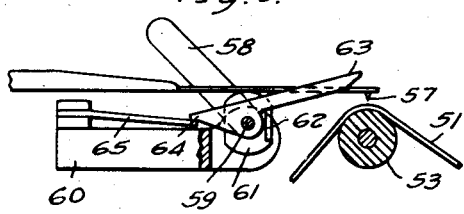
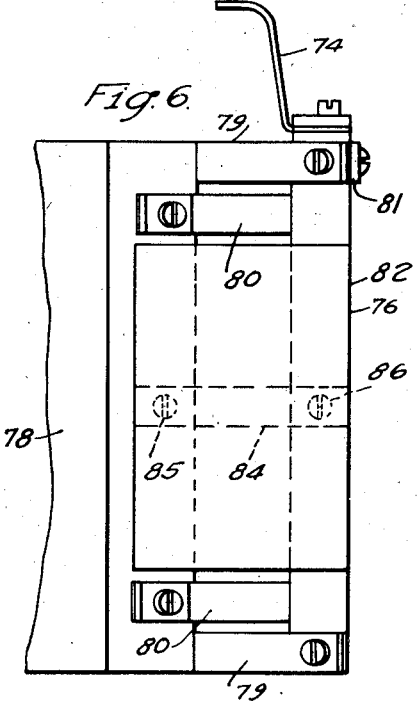
WITNESSES:
INVENTORS
Frank C. Rushing, Harry C. Werner
and Benjamin Cometti.
BY
Paul E. Friedemann
ATTORNEY Patented Jan. 15, 1946

2,393,069

UNITED STATES PATENT OFFICE 2,393,069

VIBROGRAPH

Frank C. Rushing and Harry C. Werner, Pittsburgh 21, and Benjamin Cametti, East McKeesport, Pa., assignors to Westinghouse Electric Corporation, East Pittsburgh, Pa., a corporation of Pennsylvania Application December 9, 1941, Serial No. 422,226

11 Claims. (Cl. 234—5.6)

Our invention relates to apparatus for recording the vibration of vibrating bodies.

In apparatus of the character referred to, commonly known as vibrographs, there is usually provided a pair of relatively movable parts, one of which is resiliently connected to the other. One of such parts is caused to vibrate or move with the body or object being studied while the other of such parts remains stationary, and suitable mechanism is provided for measuring and recording the movement between the relatively moving parts.

According to the manner in which the vibrograph is to be used, the vibrograph will generally be one of two different types. In one type the vibrograph is mounted directly on the object or body being studied, and the part thereof which is resiliently supported on the part secured to such object is caused to remain stationary by virtue of its inertia. In the other type, one of the parts is held in the hands of the operator while another part which is resiliently connected thereto is maintained in engagement with the vibrating object being studied. As will become apparent, the problems involved in these two types of vibrograph are different. Due to the different problems involved in apparatus of this character, vibrographs heretofore available for recording the vibration of vibrating bodies have many disadvantages such as being complicated and likely to get out of order, difficult and costly to manufacture, and heavy and cumbersome with consequent tiring effects on the operator. In addition, where the mass of the recording instrument is unduly large, such mass is likely to affect the vibration of the body being studied, particularly where the mass of such body is relatively small.

One of the principal objects of our invention is to provide an improved form of vibrograph which may either be mounted directly on the vibrating object being studied, or which may be held in the hands of the operator while recording the vibration of such object.

A further object of our invention is to provide a simplified form of vibrograph, having a minimum number of parts, which is not likely to get out of order and which may be constructed at a minimum of expense.

A further object is to provide a vibrograph having its mass so arranged and proportioned that it will not materially affect the vibration of the body being studied and so constructed that it will be capable of recording vibration frequencies over a larger range than heretofore possible.

A further object of our invention is to provide a vibrograph having a pair of relatively movable and resiliently interconnected parts, one of which is provided with all the mechanism necessary for recording the relative movement between such parts.

A further object of our invention is to provide, in apparatus of the character referred to, a new and improved form of mechanism for recording the movement between two relatively moving parts.

The above and other objects of our invention will become apparent during the following description.

In the drawings there is shown a preferred embodiment of our invention. In this showing:

Fig. 3 is a perspective view of the base of the vibrograph shown in Fig. 1 illustrating diagrammatically the manner in which the mass which includes the recording mechanism is supported on such base;

Fig. 4 is a side elevational view of the vibrograph with its casing in position, a part thereof being broken away and shown in section;

Fig. 5 is a top plan view of the timing mechanism;

Fig. 6 is a side elevational view of the mechanism shown in Fig. 5;

Figures 1, 2:
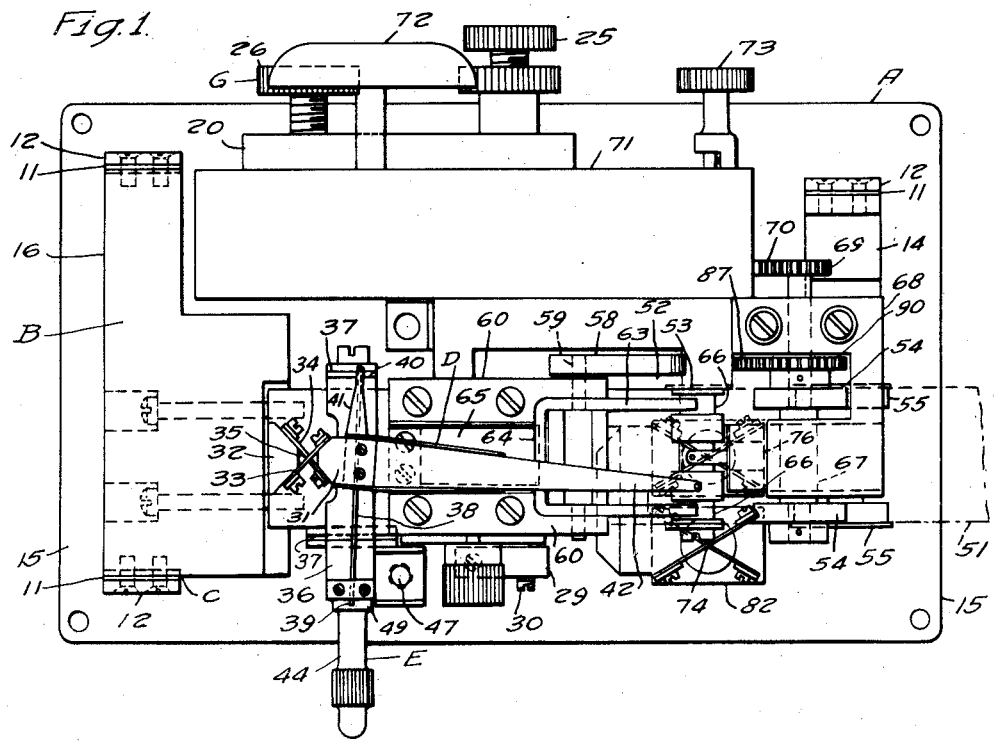
Figure 1 is a top plan view of a vibrograph (with the cover removed) constructed in accordance with the principles of our invention.
Fig. 2 is a side elevational view of the vibrograph shown in Fig. 1.

Figs. 7, 8 and 9 are broken away detailed views, partially in vertical section and partially in vertical elevation showing different positions of parts controlling the position of the recording stylus, Fig. 10 is a diagrammatic sketch illustrating the principles of our invention; and Figs. 11 and 12 show two different diagram records obtainable with a vibrograph according to Figs. 1 through 10; while Fig. 13, for explanatory purposes, shows schematically the time curve of a recorded diagram of the type shown in Fig. 11.

Referring first to Fig. 10, the letter A indicates a supporting framework to which a mass B is resiliently connected by a spring C for movement relative thereto. An indicator or exhibiting member D is pivotally connected to the mass B for indicating relative movement between the parts A and B or between the part A and prod E which is pivotally connected at one end to the indicator or exhibiting member D. The prod E is provided with a spring F for resiliently biasing the same to an outward position with respect to the mass B. Clamps G and H are provided, respectively, for securing either the mass B or the prod E against movement with respect to the support A.

The clamps G and H are selectively operated according to the manner in which it is desired to use the vibrograph. If it is desired to mount the vibrograph directly on the object whose vibration is being studied, the clamps H are operated to secure the prod E against movement with respect to the support A. In such case, the support A will move with the object being studied, and the mass B, due to its inertia, will remain stationary. Since the prod E will be moving with the support A, it will be apparent that the indicator or exhibiting member D will be caused to move with respect to the mass B and thus indicate the relative movement between the parts A and B. Due to the location of the pivotal connections for the part D, it will also be apparent that such relative movement will be magnified by the indicator D.

If it be desired to hold the support A manually while recording the vibration of the object or body being studied, the clamps H will be released and the clamps G operated to clamp the mass B against movement relative to the part A. The end of the prod E may then be placed in engagement and caused to move with the object being studied. In this case, the spring F will maintain the prod E in engagement with such object, and movement of the prod E relative to the support A will cause the indicator or exhibiting member D to move with respect to the mass B.

In order that the apparatus will operate as described above, certain problems must be taken into consideration. In the first case, where the clamps G are released and the clamps H are operated, the mass B must be as large as conveniently possible in order that the inertia of such mass will be effective to maintain the same stationary when movement is imparted to the support A. In addition, the constant, that is, the pounds force per inch deflection, of the spring C must be kept as low as possible. By having a large mass B and a low constant for the spring C, the natural frequency of the mass B is made as low as possible. In this manner, the lower limit of the range of measurable frequencies is thereby kept at a minimum.

In the second case, where the clamps G are operated and the clamps H are released, it is necessary for best results that the mass of the prod E and associated movable parts be kept at a minimum and that the spring F be sufficiently strong to maintain the end of the prod E in engagement with the object being studied. In addition, it is also necessary that the mass of the support A and the part B be sufficiently great that vibration of the object being studied will not be transmitted to the hands of the operator, since the transmission of such vibration to the hands of the operator will prevent movement of the indicator or exhibiting member D from giving an accurate indication of the movement of the vibrating object studied.

From the foregoing, it will be apparent that different problems are involved according to the manner in which the vibrograph is to be used. In the first case, it is necessary for faithful recording of vibrations that the mass of the support A be relatively light and that in the second case the mass of the support A and associated parts which include the mass B be relatively great. As will become apparent, the vibrograph of this invention answers both of these considerations. In addition, the relation of the springs C and F with respect to the part moving relatively to the support A is entirely different for such two cases.

Due to improper consideration of the problems involved, the vibrographs heretofore available have been extremely complicated and cumbersome in addition to being operable only for measuring the frequency of a vibrating body over a limited range. By reason of such complications, such vibrographs have been extremely heavy and unwieldy to operate. A vibrograph embodying the teachings of our invention may be made both compact and light in weight, thereby providing ease of maneuverability on the part of the operator without any appreciable tiring effect, in addition to providing an instrument which is operable in either of the two ways described above, which has heretofore generally required two separate and different instruments.

In Figs. 1 through 4, the letters A through H have been employed to indicate as a whole those parts of the apparatus corresponding to the parts designated by those letters in the diagrammatic sketch of Fig. 10. In this showing, the mass B includes the recording mechanism and is resiliently mounted on the support A by a plurality of flat leaf springs 11 which are secured at their upper ends 12 to the upper portion of the mass B and at their lower ends 13 to anchoring bars 14 rigidly secured to the base 15 of the support A. The springs 11 are arranged to lie with their flat portions in parallel planes so as to confine movement of the mass B back and forth in a single direction. As will be apparent from Figs. 1 and 2, the mass B will be confined to a rocking movement transversely of the part A as viewed in Figs. 1 and 2. By reason of the connection of the upper portion of the mass B to the upper parts 12 of the springs 11, it will be apparent that the center of gravity of the mass B will be positioned intermediate the ends 12 and 13 of the springs 11, thereby adding to the compactness of the suspension. Although three springs 11 have been shown in the preferred embodiment for mounting the mass B on the support A, it will be understood that a greater or a lesser number of springs 11 may be employed for this purpose if desired.

As best shown in Fig. 3, the plate or mass 16 intermediate the end springs 11 is provided with a recess or notch 17 in which is receivable the upstanding portion 18 of a member 19 which is rigidly secured to one of the anchors 14. The notch 17 is wider than the part 18 so as to permit movement of the mass B relative to the support A while providing cooperating abutting portions on A and B for limiting such relative movement. In order to statically balance mass B with the abutting member 18 positioned centrally of the notch 17, a member 20 is secured to the base 15 and is provided with a threaded adjusting member 21. An anchoring member 22 has a suitable connection (not shown) to the end of the member 21 by which axial movement of the member 21 is imparted to the member 22 without rotating the member 22. Upon rotation of the threaded member 21, such member will adjust the position of the anchoring member 22 with respect to the base 15. The mass B is resiliently connected to the member 22 by means of a pair of springs 23 which have their outer ends connected to anchor members 24 secured to the mass B, and their inner ends connected to the anchor member 22 as viewed in Fig. 3. Upon movement of the member 22 with respect to the member 20, the tension of the springs 23 will be varied to adjust the position of the mass B with respect to the abutment 18. The springs 23 cooperating with the springs 11 in positioning the mass B on the base A. In this manner, the mass B may be resiliently balanced with respect to the part A, regardless of the angular position of the support A with respect to a horizontal plane. A lock nut 25 may be provided for locking the member 21 against movement after proper adjustment of the mass B is had.

A threaded member 26 similar to the member 21 is also mounted in the block 20 for clamping the mass B against movement with respect to the support A. Upon rotation of the part 26, the end 27 thereof, as viewed in Fig. 3, will be moved into engagement with the lug 28 which is rigidly secured to the mass B as shown in Fig. 2, and continued rotation of the member 26 will move the lug 28 and thereby the mass B against the action of the springs 23 so as to move the parts 17 and 18 into abutting relationship. This movement of the mass B will be in a direction toward the post 29 secured to the base 15. The post 29 is provided with a threaded adjusting member 30, an end of which may be moved into engagement with the part B after movement of the parts 17 and 18 into abutting relationship.

The stylus or exhibiting member D is secured to a member 31 which, in turn, is pivotally connected to a part 32 secured to the plate 16. The pivotal connection between the parts 31 and 32 is provided by flat leaf springs 33 and 34 having their ends respectively connected to the parts 31 and 32. The springs 33 and 34 are arranged substantially at right angles to each other and the pivotal movement of the part 31 with respect to the part 32 will take place substantially about a line defined by the intersection of planes containing the springs 33 and 34. Such pivotal movement will take place about an axis extending through the point 35 as viewed in Fig. 1. There is thus provided a resilient pivot for the stylus D which is devoid of friction, having no relatively moving parts likely to cause wear and consequent errors in the movement of the stylus D.

In order to cause the stylus D to pivot about the point 35 relative to the mass B, an actuating member 36 is provided. The actuating member 36 is resiliently secured to the mass B by a pair of flat leaf springs 37 which have their upper ends connected to the member 36 and their lower ends to the mass B. It will be apparent that the leaf springs 37 operate to confine movement of the member 36 relative to the mass B in a single direction transversely of the apparatus as viewed in Figs. 1 and 2 in the same manner that the movement of the mass B including the recording mechanism relative to the support A is confined by the springs 11.

The actuating member 36 for the stylus D is connected thereto by means of a resilient rod 38. The rod 38 has one end 39 clamped to the member 36, and has its other end 40 connected to a member 41 secured to and projecting outwardly from the body of the stylus D. It will be particularly noted that the ends 39 and 40 are located on opposite sides of the stylus D. Upon movement of the actuating part 36 relative to the mass B, the stylus D will be caused to pivot about an axis extending through the point 35. As the stylus D pivots with respect to the mass B, the end of the projecting part 41 will move with the end 40 of the rod 38. The rod 38 is in the nature of a cantilever beam which is subjected only to simple bending. In this manner there is provided a simple form of means of interconnecting the part 36 and the stylus D which has no relatively moving parts which might develop friction and cause error in the relative movement being recorded. By reason of the arrangement of the part 36 with respect to the pivot point 35 and the end 42 of the stylus D, the movement of the end 42 will represent a multiple of the relative movement between the mass B and the actuating part 36.

The actuating member 36 is provided with a threaded opening 43 for the reception of an end of the prod 44 when it is desired to operate the instrument when holding the same manually against the object being studied. When it is desired to have relative movement between the mass B and support A represent the vibration of the body being studied, it is necessary that the actuating part 36 be clamped against movement with respect to the support A. To this end the casing 45 (see Fig. 4), which is employed to cover the mechanism shown in Figs. 1 and 2 and is suitably secured to the base 15, is provided with a flat leaf spring 46. The leaf spring 46 is provided with an opening (not shown) alignable with a threaded opening 47 formed in the actuating part 36. When it is desired to clamp the actuating part 36 against movement with respect to the casing 45, the prod 44 is removed from the opening 43 and is inserted through an opening 48 formed in the casing 45 and is screwed into position in the threaded opening 47. The prod 44 is provided with a shoulder 49 which is engageable with the portion of the leaf spring 46 surrounding the opening therein located above the threaded opening 47. In this manner the actuating part 36 will be effectively clamped against movement with respect to the support A. Attention is invited to the fact that when the part 36 is clamped to the support A and the mass B is moving relative to the support A, the actuating element 36 will move slightly up and down in a vertical plane relative to the support A. It will be noted that clamping spring 46 will permit the actuating element 36 a limited up and down movement, as viewed in Fig. 4, in order that such relative movement of the actuating element 36 with respect to the support A, as determined by the length of the springs 37 and springs 11, may take place. In this manner the clamping member 46 is operative to clamp the actuating part 36 to the support A without interfering with free movement of the mass B with respect to the support A, as would be the case if limited up and down movement of the actuating part 36, as viewed in Fig. 4, were not provided.

The mass B is provided with a cylindrical chamber 50 for the reception of a strip of Celluloid tape 51 on which the record of the relative movement is to be marked. The tape 51 is fed from the chamber 50 through a passageway 52, over a guide roll 53, and is then trained between a feed roll 54 and a tension guide roll 55. The tension guide roll 55 is mounted on a leaf spring 56 which is operative to bias the roller 55 toward the roller 54 for maintaining the tape 51 in engagement with the feed roller 54. The feed roller 54 is power-driven in a manner and by apparatus to be described, and is operative to withdraw tape 51 from the chamber 50 and feed the same outwardly at a predetermined speed over the guide roller 53. The end 42 of the stylus D is provided with a marking device 57 for forming an impression in the tape 51 as it is drawn over the roller 53. In this manner the marking member 57 will be operative to form a wave-like impression on the tape 51 representing a magnified record of the relative movement between the actuating part 36 and the mass B as transmitted to the stylus D.

The marker 57 of the stylus D is positioned directly over the roll 53, and in order to protect the marker 57 from contacting the hard surface of the roller 53 when the tape 51 is withdrawn from the chamber 50, the mechanism shown in Figs. 7, 8 and 9 is provided. This mechanism comprises a lever 58 keyed to a shaft 59 rotatably journaled in a part 60 secured to the mass B. A cam 61 having a lug 62 formed thereon is provided for a purpose to be described. A yoke member 63 is pivotally connected to the shaft 59 for cooperation with the cam 61. The end 64 of the yoke member 63 is engageable with a spring 65 which is operative to bias the yoke member 63 in a clockwise direction as viewed in Figs. 7, 8, and 9.

The lever 58 is adapted to occupy the three different positions respectively shown in Figs. 7, 8, and 9 for the purpose of controlling the position of the stylus D and the yoke member 63. In the position of the lever 58 shown in Fig. 7, the marking member 57 is in engagement with the tape 51, and the spring 65 functions to maintain the arm ends of the yoke 63 in engagement with the tape 51. When it is desired to prevent the stylus D from recording relative movement, the lever 58 is moved to the position shown in Fig. 8. As the lever 58 is moved to this position, the cam 61 is rotated to move the stylus D upwardly and the marking member 57 out of engagement with the tape 51. Movement of the lever 58 from the position shown in Fig. 8 to the position shown in Fig. 9 brings the lug 62 on the cam lever 61 into engagement with the yoke 63 and moves such yoke in a counterclockwise direction against the bias of the spring 65 to move the arm ends of the yoke 63 away from the guide roller 53 in order to facilitate passing the tape 51 over the guide roller 53 when reloading the chamber 50.

As best shown in Fig. 1, the arm ends of the yoke 63 which are normally operable to maintain the record tape in engagement with the guide roller 53 are positioned over annular grooves 66 formed in the guide roll 53. Upon operation of the feed roller 54 to withdraw all of the tape from the chamber 50 and out of engagement with the guide roller 53, the arm ends of the yoke 63 would be free to drop into an annular groove 66. This results in a clockwise movement of the yoke 63 and upon such movement taking place, the upper surface of the end 64, as viewed in Figs. 7, 8, and 9, will engage with the under side of the stylus D to move the stylus D and the marking member 57 upwardly away from the guide roller 53. The engagement of the marking member 57 directly with the surface of the roller 53 upon withdrawal of the tape with consequent damage to the marker 57 is thereby prevented.

The feed roll 54 is mounted on a shaft 67 which is rotatably journaled in a support 68 secured to the recording mass B. The shaft 67 has a gear 69 keyed to the outer end thereof which is driven by a gear 70 constituting a part of spring driven clock mechanism indicated as a whole by the numeral 71. It will be understood that the clock mechanism 71 per se forms no part of this invention, and that any suitable form of clock mechanism and connecting parts for driving the shaft 67 at a predetermined speed may be employed. Accordingly the parts of the clock mechanism have not been illustrated in detail in the interest of simplicity, it being sufficient to point out that a key 72 is provided for winding the spring motor thereof, and an adjusting knob 73 is provided for varying the rate of speed at which the clock mechanism 71 rotates the shaft 67 and the feed roller 54.

The timing mechanism comprises a stylus 74 having a marking member 75 which is provided for marking a timing wave on the underside of the tape 51 in order that a wave representing an unknown frequency, as marked on the tape 51 by the marker 57, may be compared with the timing wave representing a known frequency. The timing mechanism for operating the stylus 74 is best shown in Figs. 5 and 6. In this showing the stylus 74 is shown as connected to a mass 76 which is provided with the resilient pivot 77 connecting the same to the part 78 of the mass B. The resilient pivot 77 is similar to the pivot 35 and comprises cross springs 79 and 80, respectively, having their opposite ends connected to the part 78 and the part 76. An actuating member 81 is secured to the mass 76, and, upon striking the member 81, the mass 76 will be caused to vibrate in an oscillatory manner about an axis 77 defined by the line of intersection of planes containing the springs 79 and 80. This axis 77 or pivot point is so located as to pass through the center of gravity of the mass 76. Upon striking the member 81, the mass 76 will be caused to vibrate at a frequency determined by the constants of the springs 79 and 80 and by the weight of the mass 76. In order to cancel out the reaction force of the vibrating mass 76 on the part 78, which would otherwise affect the accuracy of the relatively moving parts A and B, a weight 82 identical with the weight 76 is provided. The weight 82 is likewise connected to the part 78 by springs 79 and 80 for pivotal movement about an axis 83 parallel to the axis 77. A flat leaf spring 84 has its opposite ends connected as at 85 and 86 to the weights 76 and 82. By reason of the connecting spring 84, the weights 76 and 82 will be caused to vibrate in equal and opposite directions when the member 81 is struck to start the mass 76 vibrating. In this manner each of the weights 76 and 82 are made to cancel out the effect of each other on the part 78, and such weights therefore do not interfere with or render inaccurate the relative movement being studied.

To operate the member 81, a gear 87 is journaled on a shaft 88 secured to the part B, and is provided with a plurality of strikers 89 projecting outwardly therefrom. As best shown in Fig. 1, the gear 87 meshes with a gear 90 keyed to the shaft 67 which is driven by the spring motor 71. Upon operation of the spring motor 71 to rotate the shaft 67, the gear 87 will be rotated by the gear 90 and the striker members 89 will be intermittently engaged with the member 81 to impart impulses thereto for the purpose of maintaining the mass 76 vibrating.

The operation of the apparatus is as follows: When it is desired to mount the support A directly on the vibrating object being studied, the spring 46 is first clamped to the actuating member 36 to prevent movement of the member 36 with respect to support A. The threaded member 26 is then operated to release the mass B for movement with respect to the support A as permitted by the springs 11. The member 21 is also operated to secure a static balance of the mass B with respect to the abutment 18 as described above. Due to the inertia of the mass B, such part will remain stationary while the support A will be moved back and forth with, and at the frequency of, the object being studied. Since the actuating part 36 is connected to the casing 45 such part will move relatively to the stationary mass B.

Due to the connection of the support A with the stylus D and the connection 35 of the stylus D to the relatively stationary mass B, the stylus D will be caused to oscillate back and forth with respect to the mass B and thereby indicate on the tape 51 the amplitude and frequency of vibration of the object being studied. A record thus obtained on tape 51 is exemplified by Fig. 11. Curve C1 is the time curve marked by stylus 74 and curve C2 the vibration record marked by stylus D.

When it is desired to hold the apparatus manually while making the necessary record of vibration, the threaded member 26 is first operated to clamp the mass B against movement with respect to the support A. The prod 44 is then disengaged from the threaded opening 47 and placed in engagement with the opening 43, as shown in Fig. 1. The other end of the prod 44 is then placed in engagement with the object being studied, and the springs 37 will bias the prod 44 outwardly to maintain the same in engagement with and follow the movement of the object being studied. It will be particularly noted in this case that the mass of the moving parts associated with the actuating member 36 are kept at a minimum, and that a comparatively light spring 37 having a low spring constant is effective to maintain the prod 44 in engagement with the vibrating body. The inertia of the actuating part 36 is thereby not effective at high frequencies to overcome the force of the spring 37, and permit movement of the part 36 out of engagement with the vibrating object. The relative movement between the part 36 and the mass B is transmitted to the stylus D in the same manner as described above. Where large amplitudes are encountered at high frequencies, it may be found necessary to secure or attach the prod 44 to the object being studied in order to make it accurately follow the movement of such object. However, such attachment will not be found to alter the manner of operation of the instrument or the principles of this invention. A record produced on tape 51 when applying the vibrograph manually is exemplified by Fig. 12. The time curve is denoted by C3, while C4 is the record written by stylus D. The waviness of the time axis of both curves C3 and C4 is due to unsteady holding of the vibrograph.

As explained above, the oscillatory system of the timing mechanism is intermittently excited by the strikers 89 of gear 87 (Fig. 5). Consequently, the time curves (C1 and C3 in Figs. 11 and 12) are in reality of the type shown in an exaggerated manner by curve C5 in Fig. 13. At the time points T1, T2 and T3, the oscillatory system receives a kick by one of the strikers, and in the intermediate intervals, the amplitude of the curve decays slightly. However, the frequency of the exciting kicks is high enough to give the recorded time wave the appearance of a substantially continuous wave train.

From the foregoing it will be apparent that there is provided a simplified form of apparatus which is readily adaptable for use in two different ways by the selective operation of the clamping members 46 and 26. By the selective operation of such clamping members, the vibrograph of this invention may be readily converted into either of the two types of vibrograph as described in connection with the diagrammatic illustration of Fig. 10. It will be particularly noted that the mass B includes all of the parts necessary for making a record of the vibrating movement being studied. Such parts, including the clock mechanism 71 and the associated timing and recording mechanism are thereby rendered available as part of the mass which is necessary in order that relative movement between the parts may be recorded. This mass B, it will be noted, is transferred to and from the support A as the circumstances require. In the first case, those parts comprising the recording mechanism are available to provide part of the inertia which maintains the mass B stationary while the support A is vibrating. In such case there is provided a minimum of unsprung weight as compared to the mass of the sprung weight. Upon clamping the mass B to the support A, the inertia of the mass A is added to that of B and becomes available for preventing vibration of the object being studied from being transmitted to the hands of the operator. The shifting of the weight of the mass B to and from the support A upon selective operation of the clamps 46 and 26 permits maintaining the total weight of the vibrograph at a minimum. The total weight of the vibrograph constructed in accordance with the principles of our invention may be readily kept under ten pounds, and it will be readily apparent that an operator may handle such weight without any appreciable physical tiring effect.

Attention is also invited to the fact that the particular form and arrangement of the flat spring 11 and 37 employed forms an important part in the provision of a vibrograph which is compact and which may be constructed at a minimum of expense. The flat springs, together with the arrangement of parts as described above, results in a vibrograph which is operable to record frequencies over a greater range than has been had with vibrographs heretofore available. Actuable working models constructed in accordance with the principles of this invention have been found capable of measuring frequencies of from about 600 to 15,000 cycles per minute.

Since certain changes may be made in the above construction, and different embodiments of the invention may be made without departing from the scope thereof, it is intended that all matter contained in the above description or shown in the accompanying drawings shall be interpreted as illustrative and not in a limiting sense.

We claim as our invention:

1. An apparatus for determining vibrations comprising, in combination, a support, a vibration exhibiting mechanism having a member of relatively large mass resiliently mounted on said support so as to be capable of vibratory motion relative thereto and an exhibiting member of relatively small mass resiliently mounted on said first member for motion relative thereto, and means for selectively clamping one of said members against motion relative to said support.

2. An apparatus for determining vibrations comprising, in combination, a support, a vibration exhibiting mechanism having a member of relatively large mass resiliently mounted on said support so as to be capable of vibratory motion relative thereto and a stylus member mounted on said first member for vibratory motion relative thereto, means connected with said stylus member for transmitting vibration thereto, and means for selectively clamping one of said members against motion relative to said support.

3. An apparatus for determining vibrations comprising, in combination, a support, a vibration exhibiting mechanism having a member of relatively large mass resiliently mounted on said support so as to be capable of vibratory motion relative thereto and a stylus member mounted on said first member for vibratory motion relative thereto, tape transport means disposed on said first member for accommodating a tape in proximity to said stylus member to receive a record in accordance with said relative stylus motion, means connected with said stylus member for transmitting vibration thereto, and means for selectively clamping one of said members against motion relative to said support.

4. An apparatus for determining vibrations comprising, in combination, a support, a vibration exhibiting mechanism having a member of relatively large mass resiliently mounted on said support so as to be capable of vibratory motion relative thereto and a stylus mounted on said member for vibratory motion relative thereto, said member and said support having cooperative abutments, respectively, disposed so as to be normally disengaged from each other, a clamping device for moving said member to a position wherein said abutments engage each other to prevent relative motion between said member and said support, and a device for clamping said stylus against motion relative to said support, whereby said mechanism is operative to selectively exhibit vibrations applied to said member and said support respectively depending upon the selective operation of said clamping devices.

5. A vibrograph comprising, in combination, a support, a vibration recording mechanism having a member of relatively large mass and an exhibiting element of relatively small mass, a plurality of leaf springs each connected at one end to said support and at the other end to said member to permit vibratory motion of said member relative to said support, a pair of crossed leaf springs each connected at one end to said member and at the other end to said element to permit pivotal motion of said element, means for transmitting extraneous vibrations to said member, and means for selectively clamping one of said element and member against motion relative to said support.

6. In an apparatus for recording a variable magnitude, a supporting body having means for accommodating a movable record receiving tape, a stylus for marking a timing wave on said tape, and means for operating said stylus comprising a pair of like weights, resilient pivots connecting each of said weights to said body for vibratory oscillating movement with respect thereto about parallel axes, and means interconnecting said weights for causing the same to vibrate in opposite directions at a tuned frequency, said stylus being connected to one of said weights.

7. In an apparatus for recording a variable magnitude, a supporting body having means for accommodating a movable record receiving tape, a stylus for marking a timing wave on said tape, means for operating said stylus comprising a pair of like weights, resilient pivots connecting each of said weights to said body, each of said pivots comprising a pair of crossed flat springs, the lines defined by the intersection of planes containing said springs being parallel and passing through the centers of gravity of said weights, and means interconnecting said weights for causing the same to vibrate in opposite directions, said stylus being connected to one of said weights.

8. In an apparatus for recording a variable magnitude, a supporting body having means for accommodating a movable record receiving tape, a stylus for marking a timing wave on said tape, means for operating said stylus comprising a pair of like weights, resilient pivots connecting each of said weights to said body, each of said pivots comprising a pair of crossed flat springs, the lines defined by the intersection of planes containing said springs being parallel and passing through the centers of gravity of said weights, and a leaf spring having its ends connected to said weights respectively for causing them to vibrate in opposite directions, said stylus being connected to one of said weights.

9. A vibrograph comprising, in combination, a support, a mass resiliently mounted on said support for vibratory motion relative thereto, a stylus pivotally mounted on said mass and linked to said support for performing an exhibiting movement relative to said mass in accordance with said vibratory motion, tape storage and feeding means disposed on said mass for accommodating a record receiving tape to cooperate with said stylus so as to produce a record of said relative stylus movement.

10. In a measuring apparatus, the combination of means for marking a time record on a record-receiving surface, drive means for advancing the surface, an oscillatory tuned mechanical system having a decaying characteristic and disposed for controlling said marking means, and intermittently operating control means controlled by said drive means and effective to impart increments of energy to said system in order to maintain it in continuous oscillation.

11. A vibrograph, comprising a support, a body resiliently mounted on said support for vibratory motion relative thereto, means mounted on said body for accommodating and moving a record-receiving surface member, a stylus movably mounted on said body and linked to said support to make a record on said surface member in accordance with said vibration, a time marking device mounted on said body for making a time record on said surface member, whereby said body, said means and said device together form a single vibratory means.

FRANK C. RUSHING.
HARRY C. WERNER.
BENJAMIN CAMETTI.